United States Patent [19]

Blasko

[11] Patent Number: 5,619,114
[45] Date of Patent: Apr. 8, 1997

[54] SIGNAL AVERAGER FOR USE WITH MOTOR CONTROLLER

[75] Inventor: Vladimir Blasko, Grafton, Wis.

[73] Assignee: Allen-Bradley Company, Inc., Milwaukee, Wis.

[21] Appl. No.: 407,443

[22] Filed: Mar. 20, 1995

[51] Int. Cl.$^6$ .................................................. H02P 3/18
[52] U.S. Cl. ........................ 318/812; 318/802; 324/990; 324/123 C
[58] Field of Search ...................... 323/280; 318/610, 318/798–812; 324/99 R, 100, 990, 111, 123 R, 124, 123 C

[56] References Cited

U.S. PATENT DOCUMENTS

| | | | |
|---|---|---|---|
| 3,614,633 | 10/1971 | Yalyshev et al. | 318/610 X |
| 3,628,129 | 12/1971 | Riley | 318/610 X |
| 3,790,707 | 2/1974 | Valenta | 178/7.2 |
| 4,075,558 | 2/1978 | Harzer | 324/99 R |
| 4,647,905 | 3/1987 | Hantke et al. | 340/347 A |
| 4,680,695 | 7/1987 | Kerkman et al. | 318/800 X |
| 5,138,552 | 8/1992 | Weedon et al. | 364/413.05 |
| 5,440,503 | 8/1995 | Maruyama | 341/143 |

Primary Examiner—David S. Martin
Attorney, Agent, or Firm—Michael A. Jaskolski; John M. Miller; John J. Horn

[57] ABSTRACT

A method and apparatus used with a motor controller for determining the average value of a voltage signal including at least two analog integrators that integrate the voltage signal during consecutive and alternating integration periods, a selector receiving each integrated value after an integration period and determining an average voltage value therefrom, and a discharger that sets each integrated value equal to zero after the value has been sampled, the apparatus and method providing a series of changing average voltage values during motor operation.

21 Claims, 7 Drawing Sheets

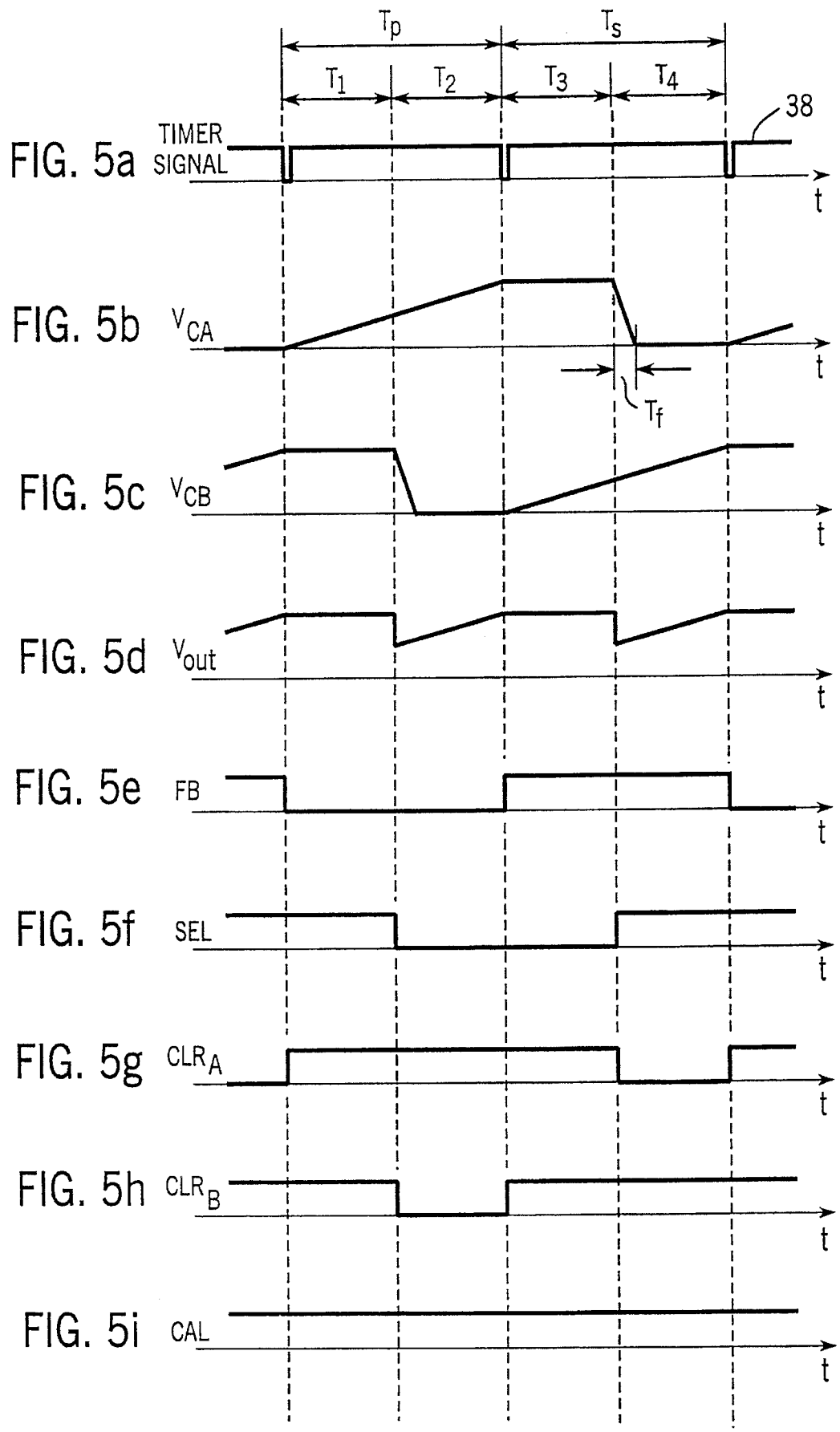

SIGNAL AVERAGER FOR USE WITH MOTOR CONTROLLER

FIELD OF THE INVENTION

The present invention relates to systems for controlling electric motors and, more particularly, to a system for providing accurate feedback voltage and/or current values used for motor control applications.

DESCRIPTION OF THE ART

Induction Motors

Induction motors have broad application in industry, particularly when large horsepower is needed. A three phase induction motor receives three phases of electrical voltage to produce a rotating magnetic stator field. A rotor contained within the stator field experiences an induced current (hence the term induction) which generates a rotor field. The interaction of the rotor field and the stator field causes rotation of the rotor.

A common rotor design is a "squirrel cage winding" in which axial conductive bars are connected at either end by shorting rings to form a generally cylindrical structure. The flux of the stator field cutting across the conductive bars induces cyclic current flows through the bars and across the shorting rings. The cyclic current flows in turn produce the rotor field.

The use of this induced current to generate the rotor field eliminates the need for slip rings or brushes to provide power to the rotor, making the design relatively maintenance free.

Field Oriented Control Of Induction Machines

To a first approximation, the torque and speed of an induction motor may be controlled by changing the frequency of the driving voltage and thus the angular rate of the rotating stator field. Generally, for a given torque, increasing the stator field rate will increase the speed of the rotor (which follows the stator field). Alternatively, for a given rotor speed, increasing the frequency of the stator field will increase the torque by increasing the slip, that is the difference in speed between the rotor and the stator field. An increase in slip increases the rate at which flux lines are cut by the rotor, increasing the rotor generated field and thus the force or torque between the rotor and stator fields.

Referring to FIG. 1, the rotating phasor 1 of the stator magneto motive force ("mmf") will generally have some angle $\alpha$ with respect to the phasor of rotor flux 2. The torque generated by the motor will be proportional to the magnitudes of these phasors 1 and 2 but also will be a function of their angle $\alpha$. The maximum torque is produced when phasors 1 and 2 are at right angles to each other (e.g., $\alpha=90°$) whereas zero torque is produced if these phasors are aligned (e.g., $\alpha=0°$). The phasor 1 may therefore be usefully decomposed into a torque producing component 3 perpendicular to the phasor 2 and a flux component 4 parallel to rotor flux phasor 2.

These two components 3 and 4 of the stator mmf are proportional, respectively, to two stator currents $I_q$, a torque producing current, and $I_d$, a flux producing current, which may be represented by orthogonal vectors in the rotating frame of reference (synchronous frame of reference) of the stator flux having slowly varying magnitudes.

Accordingly, in controlling an induction motor, it is generally desired to control not only the frequency of the applied voltage (hence the speed of the rotation of the stator flux phasor 1) but also the phase of the applied voltage relative to the current flow and hence the division of the currents through the stator windings into the $I_q$ and $I_d$ components. Control strategies that attempt to independently control the currents $I_q$ and $I_d$ are generally termed field oriented control strategies ("FOC").

Ideally, rotor torque is established by the supplied current and slip of the inverter. In reality, however, various other operating parameters that change during motor operation alter the torque-slip relationship. Therefore, where precise motor operation is required, various feedback loops are used to monitor stator winding currents and voltages.

The controller uses feedback information to determine how the inverter supplied current must be altered to compensate for system disturbances due to changing operating parameters, and then adjusts control signals to ensure the correct inverter supplied current.

Controllers that use feedback information must have accurate feedback sources. Where inaccurate feedback information is supplied to the controller, instead of correcting inverter supplied current to compensate for system disturbances, the controller may exacerbate control problems by over or undercompensating the torque and flux current components $I_d$ and $I_q$.

Unfortunately, there are many sources of feedback information error in most motor systems. In particular, most high frequency motor drives cause high frequency current harmonics in the feedback information, thus producing a jagged feedback signal.

Referring to FIG. 3(a) both the fundamental winding current 6 and a jagged feedback signal 7, including both the fundamental and harmonic components of feedback current, can be observed. Clearly, at times, the jagged feedback signal 7 is greater than, and at other times, is less than, the fundamental current 6. Periodic samples of the jagged signal 7 produce inaccurate instantaneous current feedback signals $I_d$ and $I_q$. Upon comparison of the inaccurate feedback signals to command signals, the resulting error is incorrect and the controller over or under adjusts $I_d$ and $I_q$ to eliminate the error. In effect, the harmonic currents have a rippling torque effect on motor operation.

One way to limit the effects of current harmonics is to sample average rather than instantaneous current feedback values. By determining average values over short periods, the current harmonics during each period should cancel, thus providing an accurate fundamental stator winding current value.

Feedback signal averages can be derived by providing feedback current signals to a voltage to frequency (V/F) converter and counting the pulses produced by the converter during a sampling interval. By dividing the frequency count by a corresponding period, an average current value can be derived. This system is advantageous because the V/F converters can continuously provide a frequency pulse train, thus providing averaging data corresponding to all of the feedback information. However, signal resolution using this method is limited by the frequency of pulses supplied by the converter and it decreases with shortened sampling intervals. Often, this method can create noise which is bigger than one pulse over a sampling period.

Other averagers may take advantage of an analog integration circuit to average feedback signals. Typical analog integrators employ a capacitor that charges during integration periods at the end of which the accumulated charge is sampled. By dividing the accumulated charge by a corresponding period, an average current value can be derived. While this averaging approach is accurate, it is unsatisfactory because it cannot process all of the feedback current signal information. Because this approach requires a capacitor, between integration periods, the capacitor must be discharged, during which time no integration can occur. Signal information during discharge periods is lost and hence unusable for control purposes.

Thus, it would be advantageous to have a method and/or apparatus that receives and uses all of the feedback information to accurately determine the changing average value of the signals received.

SUMMARY OF THE INVENTION

The present invention comprises both a method and an apparatus for accurately determining average stator winding current and/or voltage values for use in controlling a motor. The averager comprises first and second analog integrators, the integrators operating on the voltage signal during consecutive and alternating primary and secondary integration periods to produce a series of primary and secondary integrated values. Each integrated value is proportional to the cumulative value of the voltage signal during one of said periods. Each integrated value is maintained for a first part of a following period during which the other integrator is integrating.

A selector samples each integrated value during the following first part. A discharger sets each integrated value equal to zero after the value is sampled and during the period over which the other integrator is integrating.

One object of the present invention is to provide a signal averager that can continuously provide updated, instantaneous, and accurate average voltage values. Because two integrators are used to operate on the input voltage instead of one, one integrator can operate and the integrated value on the other can be sampled and zeroed during all primary periods, and vice versa during all secondary periods, thus providing a continuous and contiguous signal integration.

Another object of the invention is to provide an accurate signal averager. By using analog integrators instead of V/F converters to integrate, the integrators can provide high resolution signal averages.

Preferably, the controller will provide calibrating constants for each integrator and the averager will include a calibrator for mathematically combining each integrated value with a calibrating constant corresponding to the integrator that produced the integrated value to produce the average value of the voltage signal during the previous integration period. Prior to the integrators operating, the controller may provide a known DC voltage to each of the integrators to produce an integrated DC value for each of the integrators. The controller includes a divider that divides the DC voltage by each integrated DC value to produce calibrating constants corresponding to each of the two integrators.

Another object of the invention is to limit the time delay between sampling the integrated values and producing an average value. Calibration constants derived by driving the integrators with a known DC voltage during a specific interval during motor commissioning can be multiplied by the integrated values to provide the average values over sampling intervals equal to the specific interval. These calibration constants account for differences in characteristic operation between the two integrators used for integrating.

In a particularly preferred embodiment, the integrators include an operational amplifier receiving the voltage signal through a resistor at its non-inverting input and having its inverting input connected to ground. A double throw switch is attached to the output of the operational amplifier, a first lead of the switch is connected through a first capacitor to the inverting input of the operational amplifier and the second lead of the switch connected to the inverting input of the operational amplifier through a second capacitor.

Yet another object of the invention is to provide a simple and inexpensive averaging circuit. By using a double throw switch, a single operational amplifier and resistor are used to drive two capacitors, the capacitors alternating integrating periods while the resistor and operational amplifier are used at all times. This configuration also reduces variations in the integrated values that could result from different resistors and amplifiers having varying characteristics as circuit temperature changes.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIGS. 5(a)–(i) are graphs illustrating idealized waveforms of signals on major components and control signals corresponding to the signal averager shown in FIG. 4;

DESCRIPTION OF THE PREFERRED EMBODIMENT

Generally, an input voltage $V_{in}$ can be averaged over a period T by integrating the voltage $V_{in}$ over the period T and dividing the integrated value by the length of the period T. Thus:

$$V_{inave} = \frac{1}{T} \int_0^T V_{in} dt \quad (1)$$

Figure 6A:
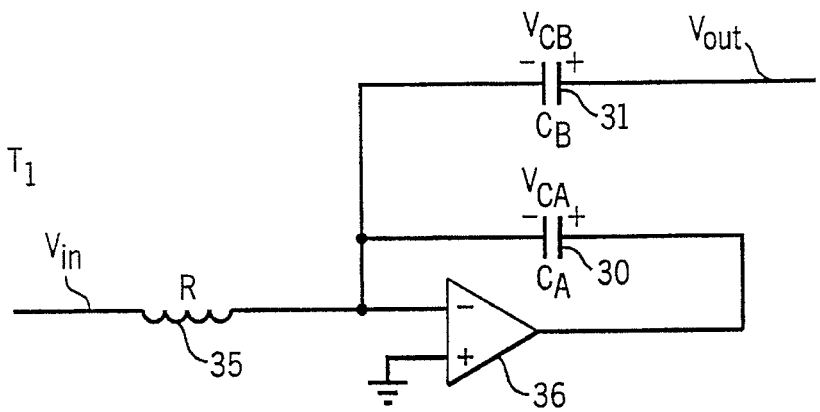
FIGS. 6(a)–(d) are simplified circuit diagrams showing the signal averager of FIG. 4 during the operational periods identified in FIG. 5(a)
Figure 6B:
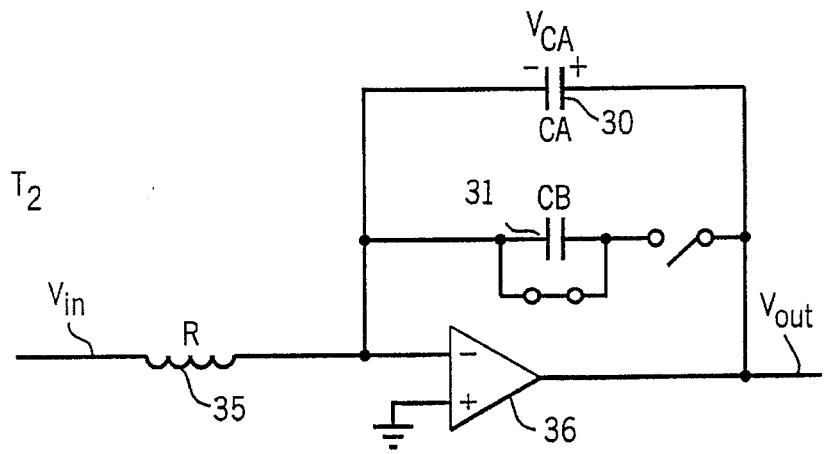

Referring to FIG. 6(b), a simple circuit which can be used to derive an average voltage value $V_{inave}$ can be observed. The circuit includes a resistor 35 connected to the inverting input of an operational amplifier 36, and a capacitor 30 providing a feedback loop between the output of the operational amplifier 36 and its inverting input, wherein the non-inverting input is grounded. With this circuit, when an input voltage $V_{in}$ is applied, the charge $V_{CA}$ across the capacitor can be expressed as:

$$V_{CA} = -\frac{1}{R \cdot C_A} \int_0^T V_{in} dt \qquad (2)$$

where R is the resistance value, $C_A$ is the capacitance value, and T is the period over which $V_{in}$ is applied to the circuit.

The circuit shown in FIG. 6(b) can also be driven by a DC voltage to derive a calibration constant $K_A$ that is a function of the operating characteristics of the capacitor 30, resistor 35, and operational amplifier 36. When a known calibrating DC voltage $V_{CAL}$ is applied to the circuit in lieu of $V_{in}$, according to Equation 2, the charge $V_{CACAL}$ across the capacitor 30 is:

$$V_{CACAL} = \frac{-1}{R \cdot C_A} \int_0^T V_{CAL} dt \qquad (3)$$

which simplifies to:

$$V_{CACAL} = -\frac{V_{CAL} \cdot T}{R \cdot C_A} \qquad (4)$$

Combining Equations 1 and 2:

$$V_{inave} = \frac{-V_{CA} \cdot R \cdot C_A}{T} \qquad (5)$$

Rearranging Equation 4:

$$T = \frac{-V_{CACAL} \cdot R \cdot C_A}{V_{CAL}} \qquad (6)$$

Combining Equations 5 and 6:

$$V_{inave} = V_{CA} \cdot K_A \qquad (7)$$

where $$K_A = \frac{V_{CAL}}{V_{CACAL}} \qquad (8)$$

Thus, a calibration constant $K_A$ can be derived that relates the average voltage $V_{inave}$ over a period to the charge $V_{CA}$ accumulated across the capacitor 30. By sampling $V_{CA}$, an average value $V_{inave}$ of the input voltage $V_{in}$ over the period T can be derived by multiplying $V_{CA}$ by the constant $K_A$.

In the present invention, two circuits like the one in FIG. 6(b), are used to produce average values of an input voltage $V_{in}$. While one circuit is integrating the input voltage $V_{in}$ to produce a charge, the charged value on the other circuit is sampled, set to zero and the sampled value is multiplied by a calibration constant. In this way, while one circuit is integrating, the other provides averaging data and thus, the averager can constantly update the average value of the input voltage $V_{in}$.

Figure 1:
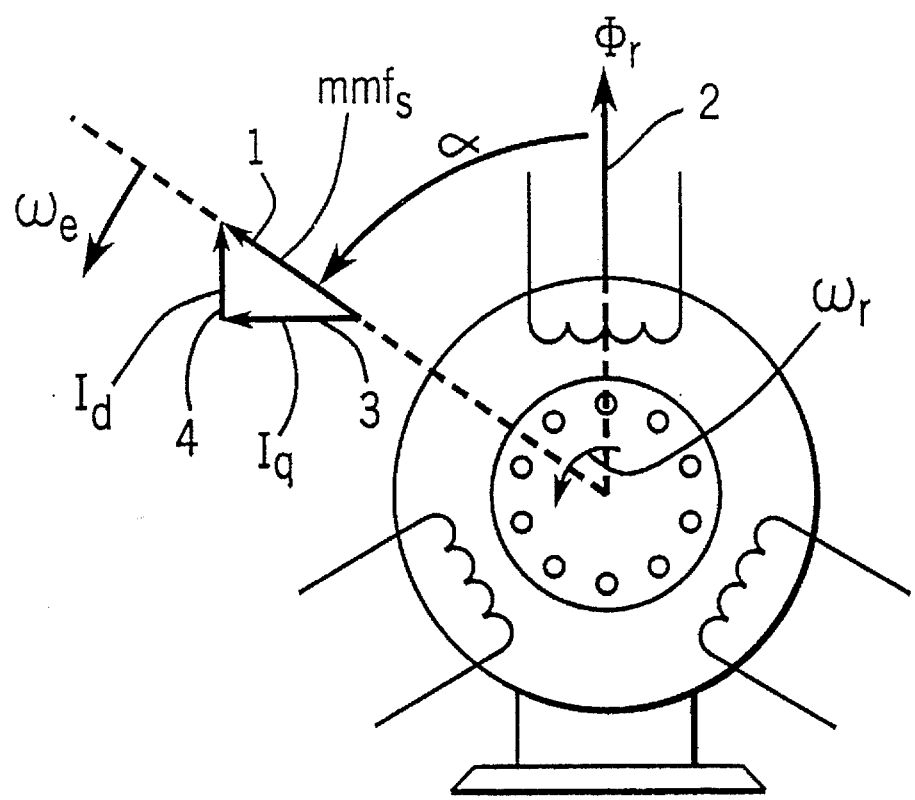
FIG. 1 is a schematic view in cross section of an induction motor showing instantaneous locations of the rotor flux, the stator mmf, and torque and flux components of the stator mmf.
Figure 2:
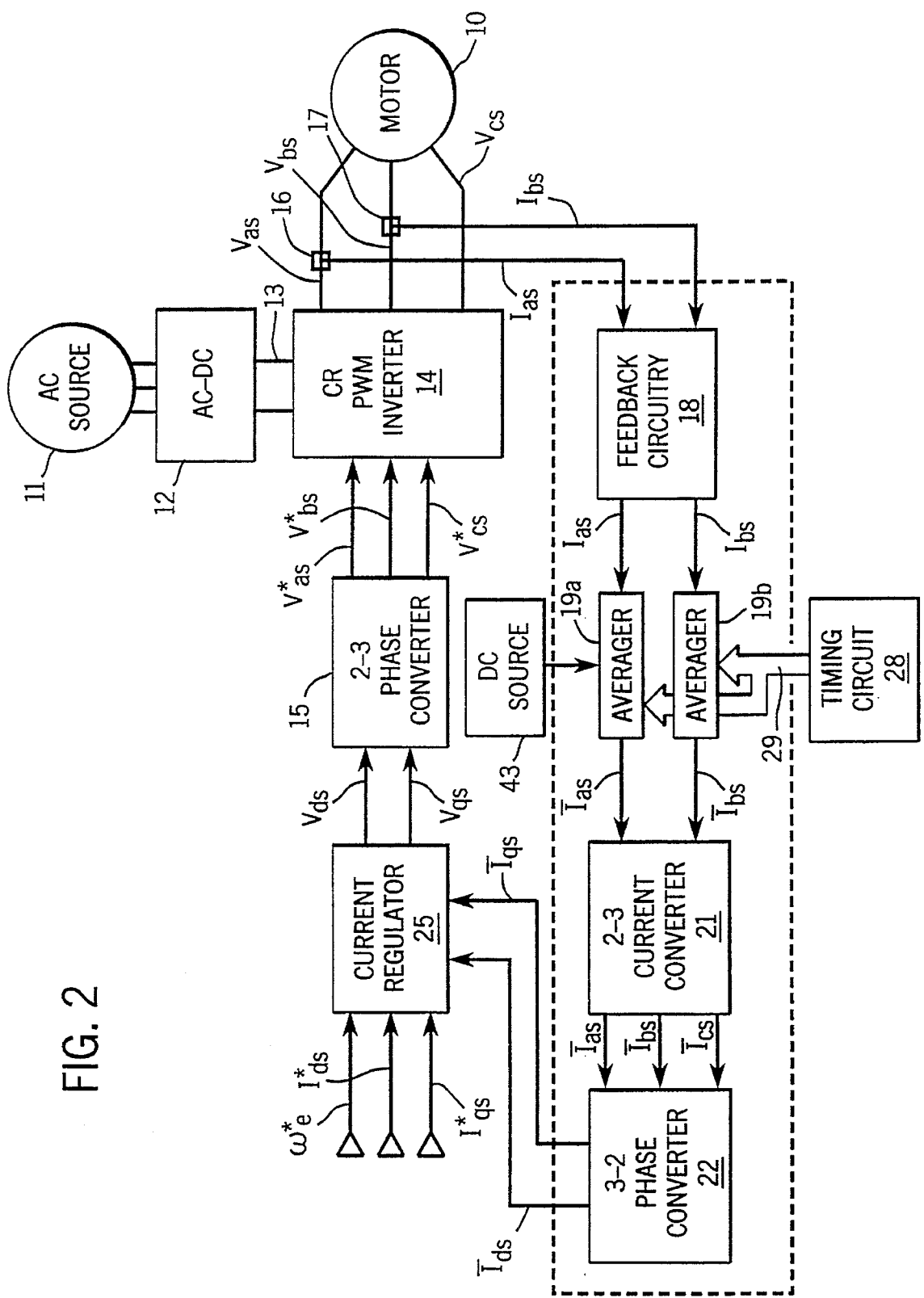
FIG. 2 provides an overall block diagram of a control system for use in controlling an AC induction motor incorporating the averager of the present invention.

Referring now to FIG. 2, the averagers of the present invention will be described in the context of a current regulated pulse width modulating (CRPWM) motor control for use with an AC induction motor 10. The motor control (also called a "drive") includes a power section that receives power at a line frequency of 60 Hz from a 3 phase AC power source 11. The three phases of the power source are connected to an AC-DC power converter 12. The AC-DC power converter 12 rectifies the alternating current signal from the AC source 11 to produce a DC voltage on a DC bus 13 that connects to power inputs on the pulse with modulating (PWM) voltage inverter 14, which completes the power section of the drive. The AC source 11, the AC-DC power converter 12, and DC bus 13 provide a DC source for generating a DC voltage of constant magnitude. The PWM inverter 14 includes a group of switching elements which are turned on and off to convert this DC voltage to pulses of constant magnitude.

The pulse train pattern from a PWM inverter is characterized by a first set of positive going pulses of constant magnitude of varying pulse width followed by a second set of negative going pulses of constant magnitude and varying pulse width. The RMS value of this pulse train patter approximates one cycle of an AC wave form. The patter is repeated to generate additional cycles of the AC wave form.

To control the frequency and magnitude of the resultant AC power signals to the motor, AC inverter control signals are applied to the PWM inverter. The PWM voltage inverter 14 receives three balanced AC inverter control signals $V^*_{as}$, $V^*_{bs}$, $V^*_{cs}$ which vary in phase by 120 degrees, and the magnitude and the frequency of these signals determines the pulse widths and the number of the pulses in the pulse trans $V_{as}$, $V_{bs}$, and $V_{cs}$ which are applied to terminals of the motor.

The asterisks in the first set of signals denotes a "command" signal. The "s" subscript in both sets of signals denotes that these signals are referred to the stationary reference frame. The voltages $V_{as}$, $V_{bs}$ and $V_{cs}$ are phase voltage signals incorporated in the line to line voltages observed across the stator terminals.

The AC inverter control signals $V^*_{as}$, $V^*_{bs}$, and $V^*_{cs}$ result from a two to three phase conversion which is accomplished with a two to three phase converter 15 of well known constructions. For example, a circuit such as that described in "Control and Simulation of a Current Fed Linear Induction Machine," by B. K. Bose and Thomas Lipo published in IEEE-IAS conference record, pages 876–883, 1978, may be employed for this purpose. The input signals $V_{qs}$ and $V_{ds}$ are sinusoidal AC voltage command signals having a control signal magnitude and a frequency. These signals are related to a stationary d-q referenced frame in which torque controlling electrical parameters are related to a q-axis and flux controlling electrical parameters are related to a d-axis. -The q-axis leads the d-axis by 90 degrees in phase difference.

A current regulator 25 provides two phase voltage signals $V_{ds}$, $V_{qs}$ that correspond to two phase AC current command signals $I^*_{qs}$ and $I^*_{ds}$ and an electrical operating frequency or speed signal $\omega^*_e$. The current command signals $I^*_{qs}$ and $I^*_{ds}$, as well as the speed signal $\omega^*_e$, may be produced by any one of a number of well known control circuits. The specific construction of the control circuit will depend on the nature of the load and on the particular control strategy which is being implemented. A number of different control circuits for AC motors are disclosed in U.S. Pat. Nos. 4,506,321 and 4,266,176.

It is the function of the current regulator 25 to produce sinusoidal voltage control signals $V_{ds}$ and $V_{qs}$ to drive the PWM inverter 14 in such a manner as to cause two-phase currents in the d-q frame of reference in the stator windings to equal the two-phase AC current command signals $I^*_{qs}$ and $I^*_{ds}$. To this end, most controllers that employ current regulators also include a current feedback loop to supply stator winding current signals $I_{qs}$, $I_{ds}$ to the regulator for comparison to the current command signals $I^*_{qs}$ and $I^*_{ds}$.

The details of one current regulator that might be used with the present invention have been previously shown and described in Kerkman et al. U.S. Pat. No. 4,680,695 issued Jul. 14, 1987. The synchronous current regulator described therein includes a proportional integral loop (PI loop) with summing inputs. At one summing input, an AC current command signal for the q-axis, $I^*_{qs}$, is algebraically summed with the feedback q-axis signal $\bar{I}_{qs}$ to provide a current error for the q-axis. At a second summing point, an AC current command signal for the d-axis $I^*_{ds}$ is algebraically summed with the feedback d-axis phase current signal $\bar{I}_{ds}$ to provide a current error for the d-axis. The electrical operating frequency in radians $\omega^*_e$ is also an input signal to both q and d-axis branches of the circuit. With these input signals, the synchronous current regulator 25 controls the AC voltage command signals $V_{ds}$ and $V_{qs}$ at its outputs in response to current error, and further, it maintains the vector orientation of the output signals to the d-axis and the q-axis.

In FIG. 2, phase currents flowing through the stator terminals are sensed, using current sensing devices 16, 17, such as current transformers or Hall devices, as are well known in the art. Each sensor 16, 17 provides a current feedback signal $I_{as}$ or $I_{bs}$. In reality, the signals $I_{as}$ and $I_{bs}$ are voltages proportional to the currents sensed. The two phase current signals $I_{as}$, $I_{bs}$ are provided to some additional current feedback circuitry 18 for converting the feedback current signals $I_{as}$, $I_{bs}$ to a level and polarity suitable for signal processing. Each feedback current signal $I_{as}$, $I_{bs}$ is provided to a separate averager 19a or 19b as an input voltage $V_{in}$ as explained in detail below.

Figure 3A:
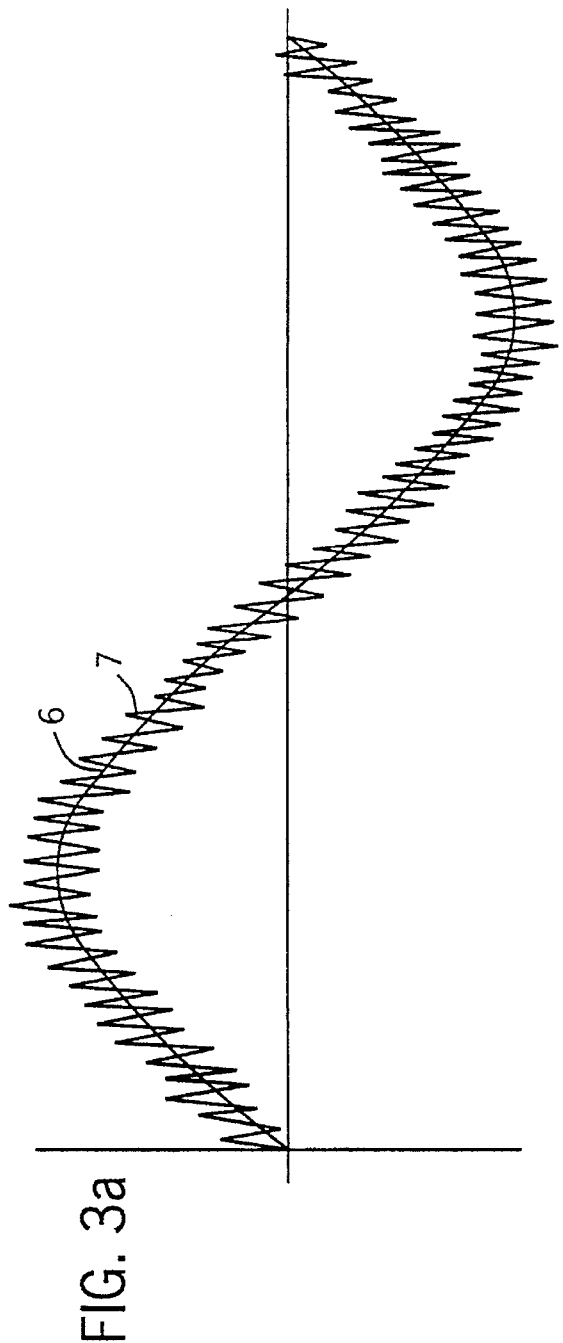
FIG. 3(a) is a graph illustrating the fundamental stator winding current and the effects of harmonics on the fundamental current.

Referring now to FIG. 3(a), graphs depicting both an ideal feedback current 6 including only the fundamental current component and a feedback current including harmonic components 7 can be observed.

Ideally, the feedback current signals $I_{bs}$, $I_{cs}$ would only include the fundamental stator winding current 6. In reality, however, the feedback current signals regularly include harmonic components and thus, are distorted sinusoidal current signals 7. Use of these distorted signals 7 by the current regulator generates faulty current error signals and hence exacerbates current control problems. The present invention effectively eliminates the harmonic components in the feedback current signals $I_{bs}$ producing data more indicative of the fundamental stator winding current 6.

Figure 3B:
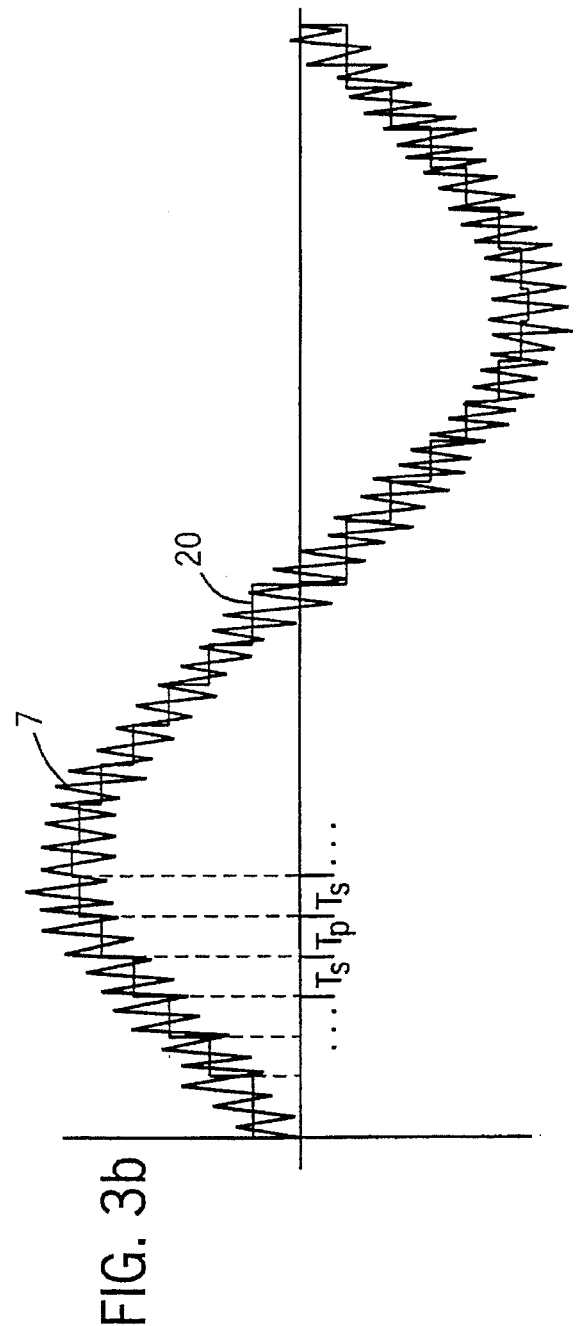
FIG. 3(b) is a graph illustrating a jagged feedback signal and an average signal.

Referring to FIGS. 2 and 3(b) each averager 19a, 19b averages a jagged signal 7 over short periods $T_s$ and $T_p$ to produce an average phase current $\bar{I}_{as}$ or $\bar{I}_{bs}$. An average phase current ($\bar{I}_{as}$) 20 includes a stepped sinusoidal curve wherein step widths correspond to periods $T_s$ and $T_p$. By limiting the duration of the periods $T_s$ and $T_p$ the average phase current values $\bar{I}_{as}$ conform to the sinusoidal fundamental stator winding current value. In this manner, the instantaneous and erroneous effects of harmonic noise are eliminated and accurate fundamental current information is provided. Operation of the averagers 19a or 19b will be explained in more detail below.

The averaged phase currents $\bar{I}_{as}$, $\bar{I}_{bs}$ are provided to a two to three current converter 21 where an average value of phase current $I_{cs}$ is calculated from the average phase current $\bar{I}_{as}$ and $\bar{I}_{bs}$ (i.e. $\bar{I}_{cs} = \bar{I}_{as} - \bar{I}_{bs}$). The three average phase currents $\bar{I}_{as}$, $\bar{I}_{bs}$ and $\bar{I}_{cs}$ are then provided to a 3-to-2 phase converter 22 converting the phase currents to d and q-axis current signals $\bar{I}_{ds}$ and $\bar{I}_{qs}$. A circuit such as that described in "Control Methods for Good Dynamic Performance Induction Motor Drives Based on Current and Voltage as Measured Quantities", by Robert Joetten and Gerhard Maeder and published in IEEE-IAS Transactions, IA-19, No. 3, May/June 1983, may be employed for this purpose. The average d and q-axis currents $\bar{I}_{ds}$ and $\bar{I}_{qs}$ are then provided to the current regulator 25 for comparison to the control current signals $\bar{I}^*_{ds}$ and $\bar{I}^*_{qs}$.

As noted previously, two averagers 19a, 19b, are included in the present invention, one averager 19a receiving input voltage $V_{in}$ corresponding to one of the feedback current signals $I_{as}$, while the other averager 19b receives input voltage corresponding to the other feedback current signal $I_{bs}$. Because both averagers 19a, 19b are identical, only one will be explained in detail below.

Figure 4:
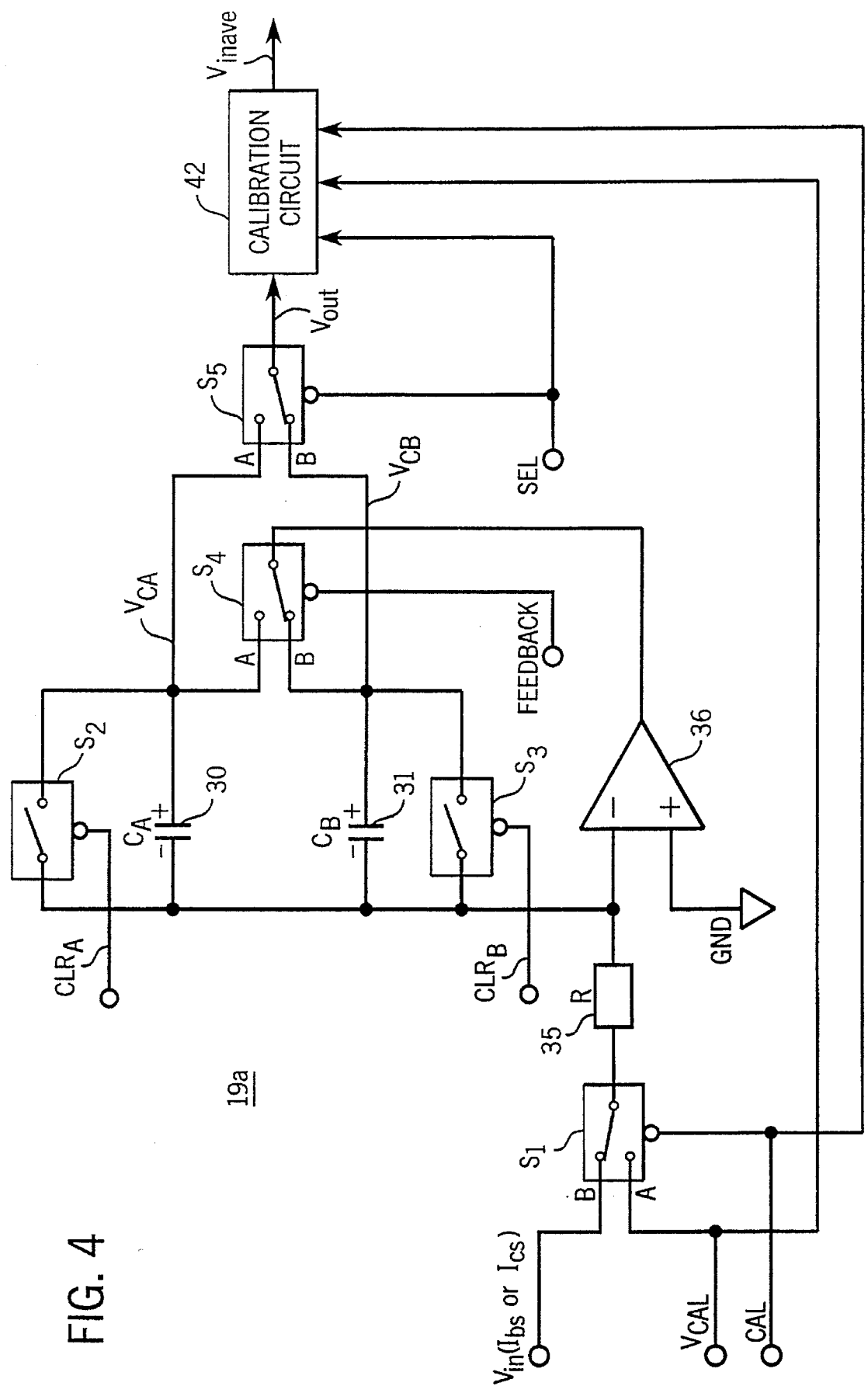
FIG. 4 is a circuit diagram of one of the averagers shown in FIG. 2.

Referring now to FIGS. 2 and 4, the averager 19a includes a plurality of switches $S_1$, $S_2$, $S_3$, $S_4$, and $S_5$, two capacitors 30, 31 and various other components that together receive the input voltage $V_{in}$ corresponding to the phase current $I_{as}$ and produce voltage $V_{inave}$ proportional to a changing average phase current $\bar{I}_{as}$.

In its simplest form, the averager 19a operates by receiving the input voltage $V_{in}$ which charges up a first capacitor 30 during a primary period. A secondary period follows the primary period. During the secondary period, the first capacitor 30 maintains its charge $V_{CA}$ while the input voltage $V_{in}$ charges the second capacitor 31. While the second capacitor 31 is charging, the charge $V_{CA}$ on the first capacitor 30 is sampled and multiplied by a calibrating constant, thus providing an average voltage value $V_{inave}$ for the primary period. During the secondary period, and after the voltage on the first capacitor 30 has been sampled, a short circuit is provided across the first capacitor 30 which allows the charge $V_{CA}$ there across to dissipate (i.e. prior to the end of the secondary period $V_{CA}=0$).

Another primary period follows the secondary period. At the beginning of the next primary period, the input voltage $V_{in}$ is taken off of the second capacitor 31 and again placed across the first capacitor 30, thus beginning to recharge the first capacitor. In addition, the second capacitor 31 holds its charge $V_{CB}$ until sampled during the first part of the primary period. After $V_{CB}$ is sampled, a short circuit is provided across the second capacitor 31 allowing the voltage there across to dissipate.

After the second primary period, the voltage $V_{in}$ is again taken off the first capacitor 30 and placed across the second 31. $V_{CA}$ on the first capacitor 30 is again sampled. This process continues, charging one capacitor while the charged value on the other capacitor is sampled, thus providing a continuous stream of data proportional to the integrated input voltage over short primary and secondary periods.

Referring still to FIGS. 2, and 5(a)–(i), a timing circuit 28 provides a plurality of control signals $CLR_A$, $CLR_B$, CAL, FB, and SEL on bus 29 to each averaging circuit 19a, 19b. The control signals control the switches $S_1$, $S_2$, $S_3$, $S_4$, and $S_5$.

When a control signal is active low, a corresponding switch changes position from open to closed, or from B to A in the case of double throw switches $S_1$, $S_4$ and $S_5$. When control signal CAL is high the input voltage $V_{in}$ is passed through the first switch $S_1$ and resistor 35 to the inverting input of an operational amplifier 36. The output of the operational amplifier 36 feeds back to the inverting input through either the first 30 or the second capacitor 31, depending upon the state of a fourth switch $S_4$ which is controlled by control signal FB. The resistor 35, operational amplifier 36, and one of the capacitors 30 or 31 (depending upon the state of the fourth switch $S_4$) comprise an integrator.

Second and third switches $S_2$, $S_3$ are provided across the first and second capacitors 30, 31 respectively. The integrating capacitors 30, 31 are discharged when their corresponding second and third switches $S_2$, $S_3$ are closed. The discharge time $T_f$ of the capacitors 30, 31 depends on the internal resistance of the second and third switches $S_2$ and $S_3$ which are usually semiconductor type switches. If desired, discharging current can be limited and the discharge time $T_f$ can be extended by additional external resistance in series with the switches $S_2$ and $S_3$.

The fifth switch $S_5$ has two input leads, a different one connected to each of the positive plates of the capacitors 30, 31, and a single output. The fifth switch $S_5$ is controlled by control signal SEL and passes a voltage value from either the first capacitor 30 or the second capacitor 31, depending upon the state of the SEL signal.

Control signals for driving the averager 19a and resulting idealized waveforms of signals on major averager components can be observed in FIGS. 5(a)–(i). Referring to FIG. 5(a), a timer signal which is used to synchronize all of the other control signals can be observed. The timer signal 38 divides averager operating time into primary and secondary periods $T_p$ and $T_s$ respectively. In addition, the timer signal 38 divides each primary period $T_p$ into first and second periods $T_1$ and $T_2$, and divides each secondary period $T_s$ into third and fourth periods $T_3$ and $T_4$.

Referring now to FIGS. 4 and 5(a)–(h), during the entire primary period $T_p$, control signal FB remains low so that the output of the operational amplifier 36 is connected through the fourth switch $S_4$ and the first capacitor 30 to the inverting input of the operational amplifier. Referring to FIGS. 6(a) and (b), when so connected, the first capacitor 30, resistor 35, and operational amplifier 36 operate together to integrate the input voltage $V_{in}$ according to Equation 2 where $T_p=T$. During the primary period $T_p$, the charge $V_{CA}$ across the first capacitor 30 steadily rises (see FIG. 5(b)).

Figure 6C:
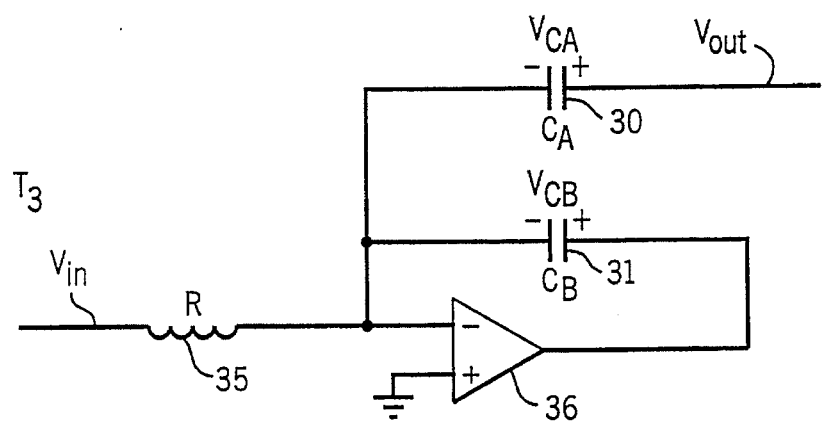
Figure 6D:
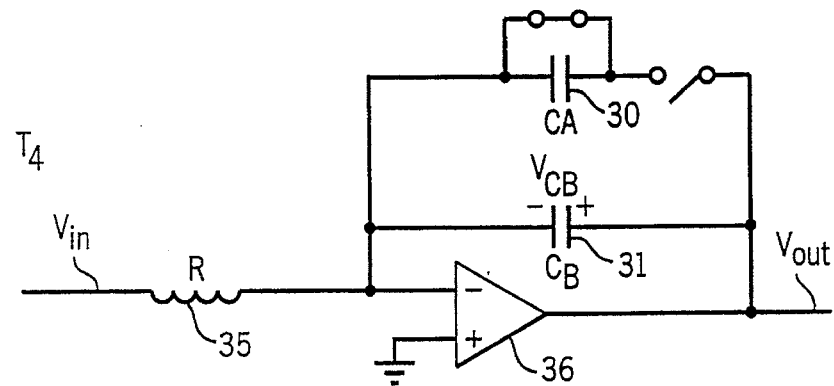

At the end of the primary period $T_p$, control signal FB goes high so that the output of the operational amplifier 36 is connected through the fourth switch $S_4$ and the second capacitor 31 to the inverting input. Referring to FIGS. 6(c) and (d), when connected in this manner, the second capacitor 31 provides a feedback loop. The resistor 35, operational amplifier 36, and second capacitor 31 operate together to integrate the input voltage $V_{in}$ according to the following equation:

$$V_{CB} = -\frac{1}{R \cdot C_B} \int_0^{T_s} V_{in} dt \qquad (9)$$

Where $T_s$ is the length of the secondary period and $C_B$ is the capacitance of the second capacitor 31. During the secondary period $T_s$, the charge $V_{CB}$ across the second capacitor 31 steadily rises (see FIG. 5(c)).

Referring still to FIGS. 4 and 5(a)–(h), after the primary period $T_p$, as the first capacitor 30 is removed from the feedback loop, it stops charging and holds a constant charge until the end of the third period $T_3$ (see FIG. 5(b)). At the end of the third period $T_3$, control signal $CLR_A$ goes low, closing the second switch $S_2$ and providing a short circuit across the first capacitor 30, thus allowing the capacitor to discharge during a discharge time $T_f$.

Similarly, at the end of the secondary period, $T_s$, the second capacitor 31 is taken out of the feedback loop, stops charging and maintains a constant charge $V_{CB}$ until the end of the first period $T_1$. At the end of the first period $T_1$, control signal $CLR_A$ goes low closing the third switch $S_3$ and providing a short circuit across the second capacitor 31 (see FIG. 5(c)).

Control signal SEL is high during the first and fourth periods $T_1$, $T_4$, passing the charge $V_{CB}$ as the output voltage $V_{out}$ and is low during the second and third periods $T_2$, $T_3$, passing the charge $V_{CA}$ as the output voltage $V_{out}$ (see FIGS. 6(a)–(d)).

Thus, the first capacitor 30 integrates the input voltage $V_{in}$ during the entire primary period $T_p$ while the charge on the second capacitor 31 is sampled during the first period $T_1$ and is zeroed during the second period $T_2$. Similarly, the second capacitor 31 integrates the input voltage $V_{in}$ during the entire secondary period $T_s$ while the charge on the first capacitor 30 is sampled during the third period $T_3$, and zeroed during the fourth period $T_4$.

This entire process is repeated during averager operation, with consecutive and alternating primary and secondary periods $T_p$ and $T_s$.

Figure 7:
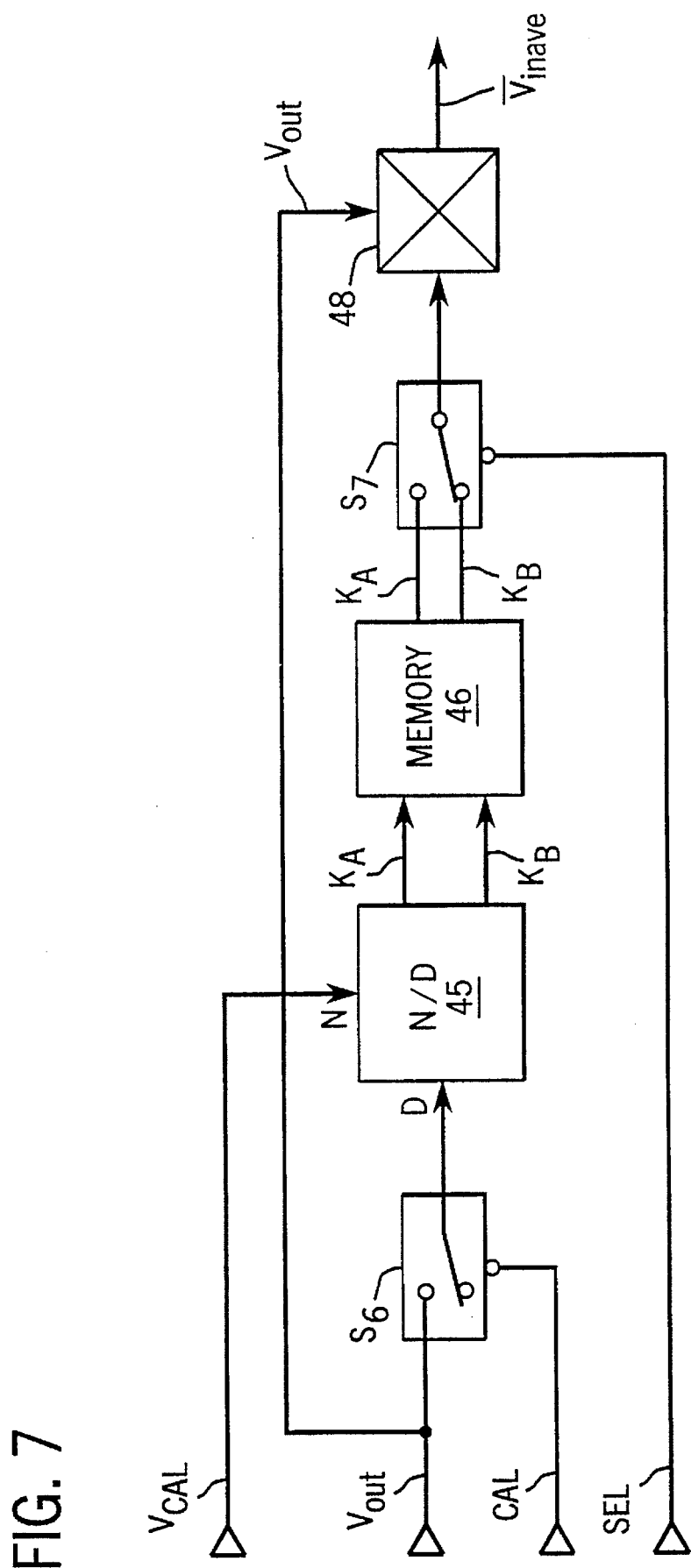
FIG. 7 is a block diagram of the calibration circuit shown in FIG. 4.

Prior to normal operation of the averager 19a, during a motor commissioning period, a separate calibrating constant $K_A$, $K_B$ for each capacitor 30, 31 must be derived according to Equation 8. Referring now to FIGS. 2, 4, and 7, to determine the calibration constants $K_A$, $K_B$, a DC source 43 provides a known DC calibrating voltage $V_{CAL}$ to the averager 19a. When control signal CAL is low (not shown in FIG. 5(i)), the calibrating voltage $V_{CAL}$ is passed through the first switch $S_1$ and resistor 35 to the operational amplifier 36. While driving the averager with the calibrating voltage $V_{CAL}$ for a number of primary and secondary periods $T_p$, $T_s$ (at least one each and preferably many), the calibrated charge $V_{CACAL}$ across the first capacitor 30 is provided as $V_{out}$ during the third periods $T_3$. The calibrated charge $V_{CBCAL}$ across the second capacitor 31 is provided as $V_{out}$ during the first periods $T_1$.

The output voltage $V_{out}$ is supplied to a calibration circuit 42 where it is received by a sixth switch $S_6$ which is also controlled by control signal CAL.

Referring to FIG. 7, during the commissioning period, the command signal CAL is active low and closes the sixth switch $S_6$ passing the output voltage $V_{out}$ to a divider 45. The divider 45 also receives the calibrating voltage $V_{CAL}$ and divides the calibrating voltage $V_{CAL}$ by the calibrated charge $V_{CACAL}$ (i.e. by the output voltage $V_{out}$ during the third period $T_3$) to produce the first calibrating constant $K_A$. The divider 45 also divides the calibrating voltage $V_{CAL}$ by the calibrated charge $V_{CBCAL}$ (i.e. the output voltage $V_{out}$ during the first period $T_1$) to produce the second calibrating constant $K_B$. The two constants $K_A$ and $K_B$ are stored in memory 46.

At the end of the commissioning period, the command signal CAL goes high and the calibration constants $K_A$ and $K_B$ remain locked in the memory 46 unless the averager is recalibrated. However, in most cases, constants will only have to be determined once, during an initial motor commissioning period and those constants will be used each time the averager is employed.

Referring still to FIG. 7, after the commissioning period and during normal motor operation, when an alternating input voltage $V_{in}$ is supplied to the averager, the resulting output voltage $V_{out}$ is supplied to a multiplier 48. The memory 46 provides the calibration constants $K_A$ and $K_B$ to separate leads of a seventh switch $S_7$. Depending upon the state of the command signal SEL, the seventh switch $S_7$ selects either $K_A$ or $K_B$ to be passed on to multiplier 48 to be multiplied by the output voltage $V_{out}$.

Because command signal SEL selects either $V_{CA}$ or $V_{CB}$ as $V_{out}$, each time the charge $V_{CA}$ across the first capacitor 30 is passed as the output voltage $V_{out}$, the seventh switch $S_7$ passes the first calibrating constant $K_A$ to produce an average input voltage $V_{inave}$. Similarly, when the charge $V_{CB}$ across the second capacitor 31 is passed as the output voltage $V_{out}$, the seventh switch $S_7$ passes the second calibrating constant $K_B$ which is multiplied by the charge $V_{CB}$ (i.e. $V_{out}$) to produce the average input voltage $V_{inave}$. $V_{inave}$ is proportional to the average current feedback value $I_{as}$ and is passed from the averager 19a to the 2–3 current converter 21 as an average current value $\bar{I}_{as}$.

Importantly, because Equations 1 and 3 are related by a common integrating period T, the primary and secondary periods $T_p$ and $T_s$ used during averaging should be identical to the periods used to derive the calibrating constants $K_A$ and $K_B$ during commissioning. For this reason, assuming calibrating periods $T_p$ and $T_s$, $V_{out}$ is only of interest during the first and third periods $T_1$, $T_3$. $V_{out}$ during second and fourth periods $T_2$, $T_4$ represents integration over only part of the calibrating periods and therefore is not useful. If greater averaging resolution requires different primary and secondary averaging periods, the constants should be recalculated during a supplemental commissioning period.

While the above description details various blocks, steps, and functions, it should be remembered that all of these elements are meant to be implemented in software as computer programs and represent algorithms for execution by a conventional type digital processor adapted for industrial applications such as a model 8096 Micro-Electronic Processor as supplied by Intel Corporation of Santa Clara, Calif.

Although the present invention has been described above in the context of an apparatus, it should be understood that the present invention also contemplates a method to be used with a motor controller for determining changing average values of currents and/or voltages. The method comprises the steps of integrating a voltage signal during consecutive and alternating integration periods to produce a series of integrated values, maintaining each integrated value for a sample period after integration and during a first part of a following integration period, sampling each integrated value during the sample period, and setting each integrated value equal to zero after the integrated value is sampled.

Preferably, the controller provides calibrating constants and the method further includes the step of mathematically combining the integrated values with corresponding calibrating constants to produce average signal values. In addition, the method may further include the steps of integrating a known DC voltage to produce an integrated DC value and dividing the DC voltage by the resulting integrating DC value to provide the calibrating constants. The integration periods may include primary and secondary periods that are consecutive and alternating. In this case, the step of integrating the voltage signal during consecutive and alternating integration periods includes the steps of integrating the voltage signal during all primary periods to produce primary integrated signals and integrating the voltage signal during all secondary periods to produce secondary integrated signals, and the step of sampling includes the steps of sampling the primary and secondary integrated signals.

In a particularly preferred method, each primary period includes a first and a second period and each secondary period includes a third and a fourth period and the step of sampling each integrated value includes the steps of sampling the primary integrated signal during each following third period and sampling the secondary integrated signal during each following first period, and the step of setting each said integrated value equal to zero includes the steps of setting the primary integrated signal equal to zero during each following fourth period and setting the secondary integrated signal to zero during each following second period.

It should be noted that the methods and apparatuses described above are only exemplary and do not limit the scope of the invention, and that various modifications can be made by those skilled in the art that may fall under the scope of the invention.

For example, while one timing sequence has been shown in FIGS. 5(a)–(i), many different timing sequences could be used. For example, the first capacitor could be used to integrate over a primary period which is shorter than the secondary period.

In addition, different schematic diagrams for the integrator-discharge circuits could be employed. If desired, more than two integrators could be used so that the periods over which integration occurs could be made smaller.

Moreover, while the present invention has been described as a voltage averager for use with a motor controller, the present invention could be used in many applications where an average voltage value is required and should not be limited to motor controllers.

In order to apprise the public of the various embodiments that may fall within the scope of the invention, the following claims are made:

I claim:

1. A signal averager for use with a motor controller for determining the changing average value of a voltage signal, the averager comprising:

at least two analog integrators, the integrators integrating the voltage signal during consecutive and alternating integration periods to produce a series of integrated values, each integrated value being operated on to produce an average value which is maintained for a first part of a following period during which the other integrators are integrating;

a selector that samples each integrated value during the first part of the following period, each sampled value being proportional to a cumulative value of the voltage signal during the integration period the integrated value was produced; and a discharger for setting each integrated value equal to zero after the value is sampled and during the period over which the other integrators are integrating.

2. The averager as recited in claim 1 wherein, the controller provides a calibrating constant for each integrator and the averager further includes a calibrator for mathematically combining each integrated value with a calibrating constant corresponding to the integrator that produced the integrated value to provide the average value of the voltage signal during the previous integration period.

3. The averager as recited in claim 2 wherein, prior to the integrators operating on the voltage signal, the controller provides a known DC voltage to each of the integrators to produce an integrated DC value for each of the integrators and the averager includes a divider that divides the DC voltage by each integrated DC value to produce the calibrating constants.

4. The averager as recited in claim 3 wherein the calibrator mathematically combines by multiplying an integrated value by a corresponding calibrating constant.

5. The averager as recited in claim 1 wherein the at least two integrators are a first and a second integrator, the first integrator integrates the voltage signal during all primary periods to produce a primary integrated signal and the second integrator integrates the voltage signal during all secondary periods to produce a secondary integrated signal, and the primary and secondary periods alternate and are consecutive.

6. The averager as recited in claim 5 wherein each primary period includes a first and a second period and each secondary period includes a third and a fourth period and wherein the primary integrated signal is sampled during each third period, and the primary integrated signal is set to zero during each fourth period and the secondary integrated signal is sampled during each of the first periods, and the secondary integrated signal is set to zero during each of the second periods.

7. The averager as recited in claim 1 wherein the integration periods are of identical duration.

8. The averager as recited in claim 1 wherein the voltage signal is proportional to a current signal.

9. The averager as recited in claim 1 wherein the integrators include an operational amplifier receiving the voltage signal through a resistor at its inverting input and having its non-inverting input connected to ground, a double throw switch attached to the output of the operational amplifier, a first lead of the switch connected through a first capacitor to the inverting input of the operational amplifier and the second lead of the switch connected to the inverting input of the operational amplifier through a second capacitor.

10. The averager as recited in claim 9 wherein the discharger includes two switches, one switch across each capacitor, the switches open and allowing their respective capacitors to charge up during respective integration periods and closed to form a short circuit for discharging their respective capacitors.

11. The averager as recited in claim 9 wherein the selector is a double throw switch with a first lead connected to the positive plate of the first capacitor and a second lead connected to the positive plate of the second capacitor.

12. A signal averager for use with a motor controller for determining the average value of a voltage signal, the controller determining first and second calibrating constants, the averager comprising:

a first analog integrator integrating the voltage signal during all primary periods to produce a primary signal for each primary period, the primary signal being proportional to a first cumulative value of the voltage signal during the preceding primary period;

a second analog integrator integrating the voltage signal during all secondary periods to produce a secondary signal for each secondary period, the secondary signal being proportional to a second cumulative value of the voltage signal during the preceding secondary period, wherein the primary and secondary periods alternate and are successive;

a selector that samples each primary signal during a first part of a following secondary period and samples each secondary signal during a first part of a following primary period;

a discharger for setting the primary signal equal to zero during the following secondary period after the selector samples the primary signal and setting the secondary signal equal to zero during the following primary period after the selector samples the secondary signal; and a calibrator mathematically combining the primary signal with the first calibrating constant to produce a first average signal and mathematically combining the secondary signal with the second calibrating constant to produce a second average signal, each of the first and second average signals being an average value of the voltage signal.

13. The averager as recited in claim 12 wherein, prior to the integrators operating, the controller provides a known DC voltage to each of the integrators to produce an integrated DC value for each of the integrators and the averager includes a divider that divides the DC voltage by each integrated DC value to produce a first calibrating constant corresponding to the first integrator and a second calibrating constant corresponding to the second integrator.

14. The averager as recited in claim 13 wherein the calibrator mathematically combines by multiplying the primary signal by the first calibrating constant and multiplying the secondary signal by the second calibrating constant.

15. The averager as recited in claim 12 wherein each primary period includes a first and a second period and each secondary period includes a third and a fourth period and wherein the primary signal is sampled during each third period, and the primary signal is set to zero during each fourth period and the secondary signal is sampled during each of the first periods, and the secondary signal is set to zero during each of the second periods.

16. A method to be used with a motor controller and analog circuitry for determining a continuous stream of average values of a voltage signal during consecutive and alternating integration periods to produce a series of integrated values;

integrating the voltage signal during consecutive and alternating integration periods to produce a series of integrated values;

maintaining each integrated value for a sample period after integration and during a following integration period;

sampling each integrated value during the sample period each sampled value proportional to the cumulative value of the voltage signal during one of said periods;

multiplying each integrated value by a calibration constant to produce the average value of the voltage signal; and setting each integrated value equal to zero after the integrated value is sampled.

17. The method as recited in claim 16 wherein the controller provides calibrating constants and the method further includes the step of mathematically combining each integrated value with a calibrating constant to provide the average value of the voltage signal.

18. The method as recited in claim 17, wherein the circuit includes a plurality of integrators and the method further includes the steps of supplying a known DC voltage to each integrator during an integration period, operating on the DC voltage with each integrator to produce an integrated DC value for each integrator, and dividing the DC voltage by each resulting integrated DC value to provide the calibrating constants.

19. The method as recited in claim 18 wherein the step of mathematically combining includes the step of multiplying an integrated value by a corresponding calibrating constant.

20. The method as recited in claim 16 wherein the integration periods include primary and secondary periods that are consecutive and alternating, the step of integrating the voltage signal during consecutive and alternating integration periods includes the steps of integrating the voltage signal during all primary periods to produce a primary integrated signal and integrating the voltage signal during all secondary periods to produce a secondary integrated signal, and the step of sampling includes the steps of sampling the primary and secondary integrated signals.

21. The method as recited in claim 20 wherein each primary period includes a first and a second period and each secondary period includes a third and a fourth period and wherein the primary integrated signal is sampled during each third period and is set to zero during each fourth period and the secondary integrated signal is sampled during each of the first periods and is set to zero during each of the second periods.

* * * * *